(12) United States Patent
Miners et al.

(10) Patent No.: US 11,971,119 B2
(45) Date of Patent: Apr. 30, 2024

(54) PINCH VALVE ASSEMBLY

(71) Applicant: Ecopinch Pty Ltd, South Nowra (AU)

(72) Inventors: Adam Miners, Kiama (AU); Allan Miners, Kiama (AU)

( * ) Notice: Subject to any disclaimer, the term of this patent is extended or adjusted under 35 U.S.C. 154(b) by 76 days.

(21) Appl. No.: 17/998,628

(22) PCT Filed: Apr. 26, 2022

(86) PCT No.: PCT/AU2022/050375
§ 371 (c)(1),
(2) Date: Nov. 11, 2022

(87) PCT Pub. No.: WO2022/226580
PCT Pub. Date: Nov. 3, 2022

(65) Prior Publication Data
US 2023/0175597 A1  Jun. 8, 2023

(30) Foreign Application Priority Data
Apr. 26, 2021 (AU) ................................ 2021901225

(51) Int. Cl.
*F16K 7/07* (2006.01)
*F16K 31/122* (2006.01)
*F16K 31/126* (2006.01)

(52) U.S. Cl.
CPC ............ *F16K 7/07* (2013.01); *F16K 31/1225* (2013.01); *F16K 31/126* (2013.01)

(58) Field of Classification Search
CPC ..... F16K 7/07; F16K 7/04; F16K 7/02; F16K 31/1225; F16K 31/126; F15B 15/02; F15B 2215/00

(Continued)

(56) References Cited

U.S. PATENT DOCUMENTS 2,936,994 A * 5/1960 Lau ........................... B65B 1/18
141/90
3,197,173 A * 7/1965 Taubenheim ............. F16K 7/06
24/527

(Continued)

FOREIGN PATENT DOCUMENTS

CN 111677906 A 9/2020
FR 1014043 A 8/1952

(Continued)

OTHER PUBLICATIONS

International Search Report & Written Opinion dated Jul. 8, 2022 from PCT App. No. PCT/AU2022/050375.

*Primary Examiner* — Craig J Price
*Assistant Examiner* — Andrew J Rost
(74) *Attorney, Agent, or Firm* — INNOVATION CAPITAL LAW GROUP, LLP; Vic Lin

(57) ABSTRACT

A pinch valve assembly has opposing pinch members for pinching oppositely against a fluid conduit sleeve and a hydraulic displacement mechanism acting on the opposing pinch members. The hydraulic displacement mechanism a hydraulic displacement push rod coupled to a first pinch member at one end and penetrating a hydraulic reservoir at an opposite end to displace hydraulic fluid therein and a pinch member push rod penetrating the hydraulic reservoir at one end and coupled to a second pinch members at an opposite end. As the first pinch member moves towards the sleeve to pinch against one side of the sleeve, the at least one hydraulic displacement push rod moves into the hydraulic reservoir to displace hydraulic fluid therein to cause the pinch member push rod to be pushed from the hydraulic reservoir under pressure to push against the second pinch member to pinch against an opposite side of the valve.

20 Claims, 18 Drawing Sheets

(58) Field of Classification Search
USPC .......................................................... 251/5, 7
See application file for complete search history.

(56) References Cited

U.S. PATENT DOCUMENTS

| | | | | |
|---|---|---|---|---|
| 3,491,983 | A * | 1/1970 | Van Damme | F16K 7/06 251/5 |
| 3,695,576 | A * | 10/1972 | Kane | F16L 33/28 251/5 |
| 4,073,467 | A * | 2/1978 | Little | F16K 7/06 24/524 |
| 4,322,054 | A | 3/1982 | Campbell | |
| 4,436,277 | A * | 3/1984 | Robak | F16K 7/06 251/9 |
| 5,441,231 | A | 8/1995 | Payne et al. | |
| 5,657,960 | A * | 8/1997 | Taylor | F16K 7/061 251/7 |
| 6,095,492 | A * | 8/2000 | Rubitschung | A62C 4/02 251/212 |
| 6,536,738 | B2 * | 3/2003 | Inoue | F16K 7/06 251/5 |
| 11,255,447 | B1 * | 2/2022 | McKenna | F16K 7/06 |
| 2009/0121166 | A1 * | 5/2009 | Gabelgaard | F16K 7/06 251/7 |

FOREIGN PATENT DOCUMENTS

| | | | |
|---|---|---|---|
| GB | 1588966 | A | 5/1981 |
| JP | H081527 | A | 1/1996 |

\* cited by examiner

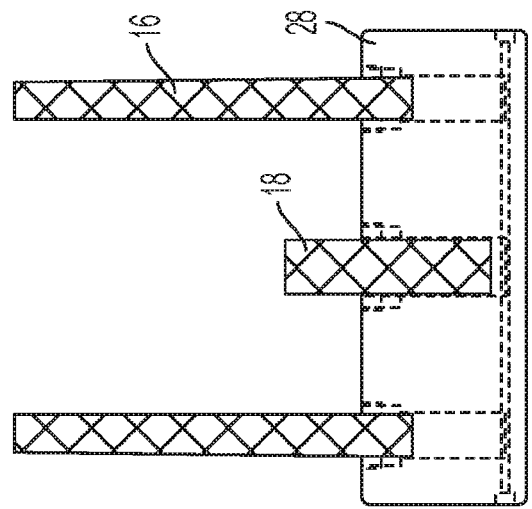
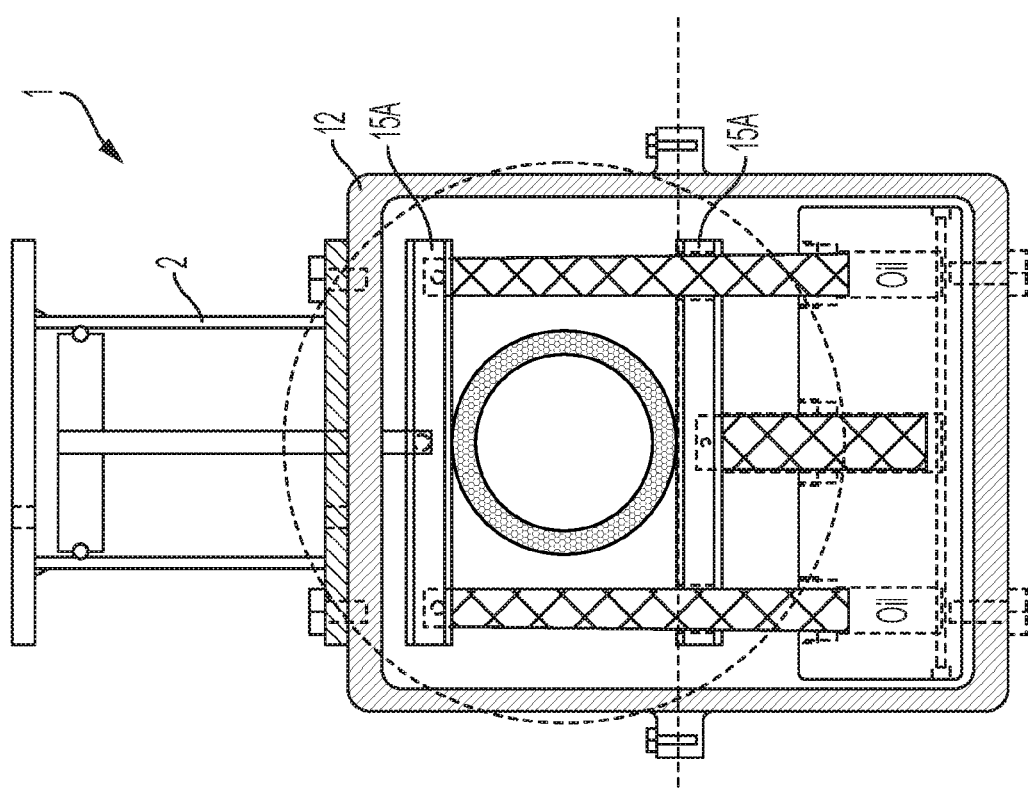
Figure 10

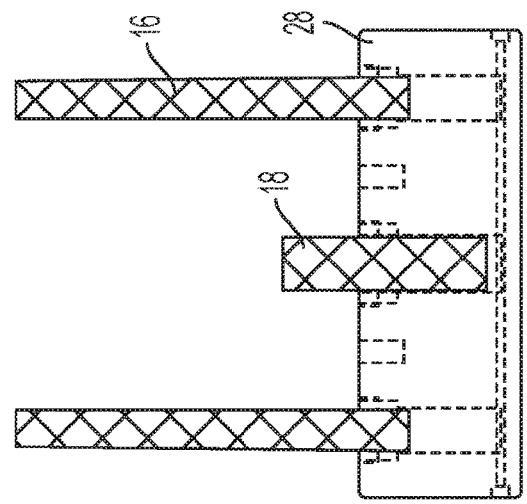
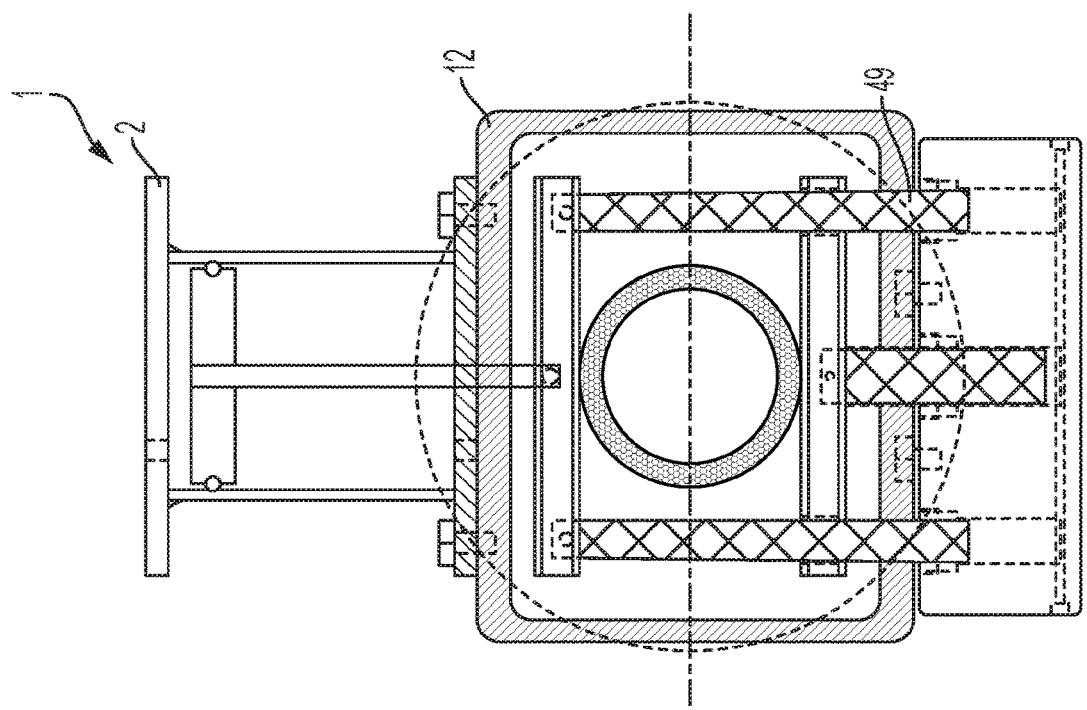
Figure 11

PINCH VALVE ASSEMBLY

FIELD OF THE INVENTION

The present invention relates to a pinch valve assembly and in particular, but not necessarily entirely, to a pinch valve assembly having a hydraulic displacement mechanism.

BACKGROUND OF THE INVENTION

FIGS. 1-4 show a pinch valve 1 in accordance with the prior art 1 such as which is substantially disclosed in US application U.S. Pat. No. 4,322,054A.

FIG. 1 shows the pinch valve 1 comprising a bifurcated valve housing 47 having upper and lower portions which are bolted together and wherein the housing 47 comprises a distally opposite pipe flanges 48.

The prior art pinch valve 1 comprises a pneumatic cylinder 2 having a piston 4 therein. The piston 4 is operably coupled to a piston push rod 3 that acts on a first pinch bar 5. Furthermore, the cylinder 2 body acts on a pair of pull bars 6 that act on a second and opposite second pinch bar 7.

The first and second pinch bars 5, 7 act oppositely to pinch on a sleeve 8 for the selective closure thereof.

Specifically, turning to FIG. 2, there is shown the pinch valve 1 having been actuated to close the sleeve 14.

Specifically, as can be seen, the piston 4 causes the piston push rod 3 to pinch the first pinch bar 5 against one side of the sleeve 8 and the cylinder 2 body causes the pull bars 6 to pinch the second pinch bar 7 against and opposite side of the sleeve 8 so as to crush the sleeve 8.

FIG. 3 shows a cross-sectional side view of the prior art pinch valve 1 showing the arrangement of the cylinder 2 comprising the piston 4 and the push and pull rods 3, 6 acting on the opposing pinch bars 5, 7.

Turning to FIG. 4, there is shown the prior art pinch valve 1 once actuated.

As can be seen, the actuation of the pinch valve 1 causes the pneumatic cylinder 2 to "float" away from the valve housing 47 for a distance being half that of the diameter of the sleeve 8 such that the particular prior art pinch valve 1 arrangement can be referred to as a "floating cylinder" arrangement. The floating cylinder arrangement is required for centreline closing of the sleeve 8.

However, the prior art pinch valve 1 suffers from the disadvantage in that the floating pneumatic cylinder 2 is hazardous as it may strike or pinch against objects or personnel.

Furthermore, the prior art pinch valve 1 is not particularly efficient wherein, for example, to close a sleeve 8 of 100 mm diameter, the piston 4 itself needs to travel the same distance of 100 mm.

Such increases the energy usage of the pinch valve 1 in either requiring a relatively large amount of compressed air or other forms of energy such as electrical energy wherein an electromechanical actuator is utilised.

The present invention seeks to provide a pinch valve, which will overcome or substantially ameliorate at least some of the deficiencies of the prior art, or to at least provide an alternative.

It is to be understood that, if any prior art information is referred to herein, such reference does not constitute an admission that the information forms part of the common general knowledge in the art, in Australia or any other country.

SUMMARY OF THE DISCLOSURE

According to one aspect, there is provided a pinch valve assembly comprising opposing pinch members for pinching oppositely against a fluid conduit sleeve; a hydraulic displacement mechanism acting on the opposing pinch members, the hydraulic displacement mechanism comprising: at least one hydraulic displacement push rod coupled to a first pinch member at one end and penetrating a hydraulic reservoir at an opposite end to displace hydraulic fluid therein; at least one pinch member push rod penetrating the hydraulic reservoir at one end and coupled to a second pinch members at an opposite end such that, in use: as the first pinch member moves towards the sleeve to pinch against one side of the sleeve, the at least one hydraulic displacement push rod moves into the hydraulic reservoir to displace hydraulic fluid therein to cause the pinch member push rod to be pushed from the hydraulic reservoir to push against the second pinch member to pinch against an opposite side of the valve.

The at least one hydraulic displacement push rod may be a pair of hydraulic displacement push rods connected at opposite ends of the first opposing pinch member.

The at least one pinch member push rod may be a single pinch member push rod connected substantially midway the second pinch member.

The pinch valve may further comprise a pair of cylindrical chamber portions for the receipt of the pair of hydraulic displacement push rods therein and a single cylindrical chamber portion for the receipt of the single pinch member push rod therein and further comprising hydraulic fluid channels fluidly connecting the cylindrical chamber portions.

The cross-sectional area of the pair of hydraulic displacement push rods may equal that of the single pinch member push rod.

The pinch valve may further comprise an actuator mechanism comprising a piston rod operably coupled to the first pinch member.

The actuator mechanism may be a pneumatic actuator mechanism.

The pneumatic actuator mechanism may comprise an opening air port and a closing air port.

The pinch valve may further comprise a zero adjustment mechanism operably coupled to the hydraulic reservoir for adjusting the position of the pinch members in an open configuration.

The zero adjustment mechanism may comprise a threaded zero adjustment screw operably coupled to the reservoir for incrementally pressurising the reservoir.

The hydraulic displacement mechanism may comprise a peripheral flexible diaphragm containing the hydraulic fluid therein and wherein the at least one hydraulic displacement push rod bears against the diaphragm so as to cause an adjacent region of the diaphragm to roll inwardly so as to displace hydraulic fluid so as to conversely cause a region of the diaphragm adjacent the at least one pinch member push rod to roll outwardly to displace the pinch member push rod.

The hydraulic displacement mechanism may comprise bellows comprising at least one pinch member push bellow in fluid communication with at least one hydraulic displacement push bellow and wherein the hydraulic displacement push rods may act on the at least one hydraulic displacement push bellows so as to inflate the at least one pinch member push bellow.

The maximum interior volume of the at least one pinch member push bellow may be larger than that of the at least one at least one hydraulic displacement push bellow.

The pinch valve may further comprise a hydraulic override for controlling the closing together of the first and second pinch members.

The hydraulic override may comprise the ends of the at least one hydraulic displacement push rod within the reservoir comprising an O-ring so as to define a pressurisation chamber above the O-ring and further comprising a pressurising means to pressurise the pressurisation chamber above the O-ring so as to displace the hydraulic displacement push rods downwardly.

The pressurising means may comprise a hydraulic hand pump and pressurisation conduits operably coupling the hydraulic hand pump and the pressurisation chamber.

The pinch valve may further comprise a hydraulic override for controlling the displacement of the second pinch member.

The hydraulic override may comprise a pressurisation chamber for selectively pressurising the hydraulic reservoir so as to displace the at least one pinch member push rod.

The at least one pinch member push rod may have a length substantially greater or equal to the length of the diameter of the sleeve.

The hydraulic displacement mechanism may comprise a pair of laterally located hydraulic reservoirs each comprising a hydraulic displacement push rod and a pinch member push rod acting oppositely and wherein the pinch member push rods act on opposite sides of the second pinch member.

Other aspects of the invention are also disclosed.

BRIEF DESCRIPTION OF THE DRAWINGS

Notwithstanding any other forms which may fall within the scope of the present invention, preferred embodiments of the disclosure will now be described, by way of example only, with reference to the accompanying drawings in which:

FIG. 10 shows the retrofit of a hydraulic displacement piece within a prior art pinch valve;

FIG. 11 shows the retrofit of a hydraulic displacement piece exterior a prior art pinch valve;

DESCRIPTION OF EMBODIMENTS

Figure 1:
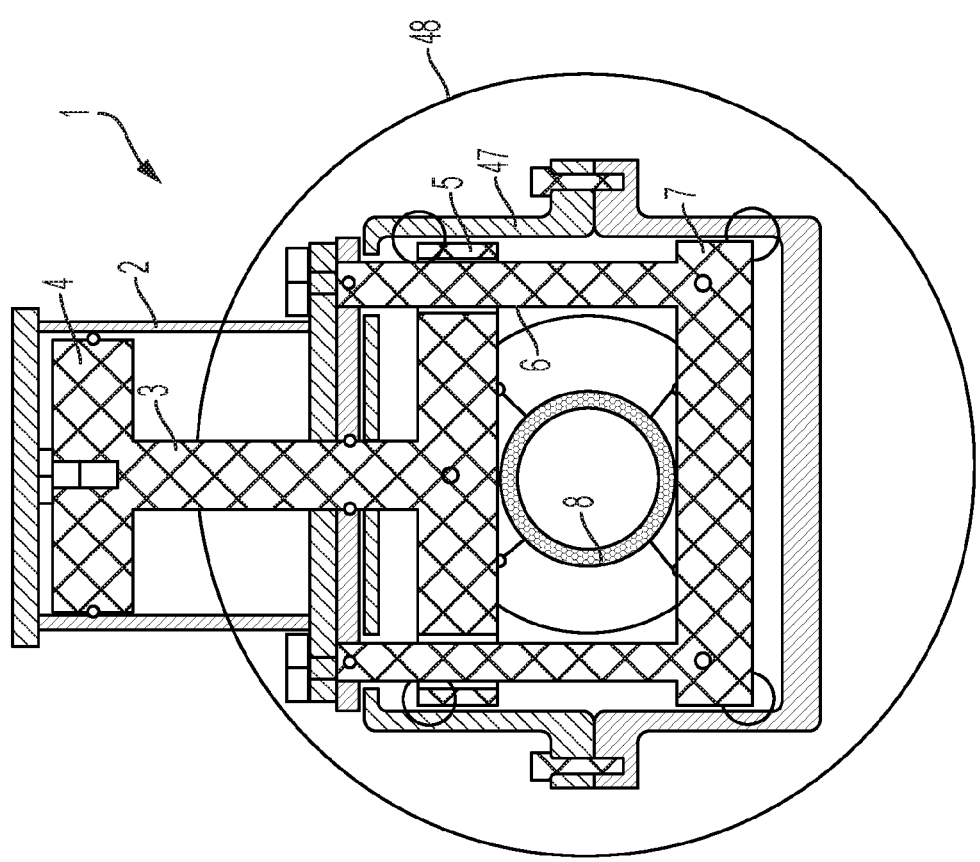
FIG. 1 shows a prior art pinch valve in an open configuration.
Figure 2:
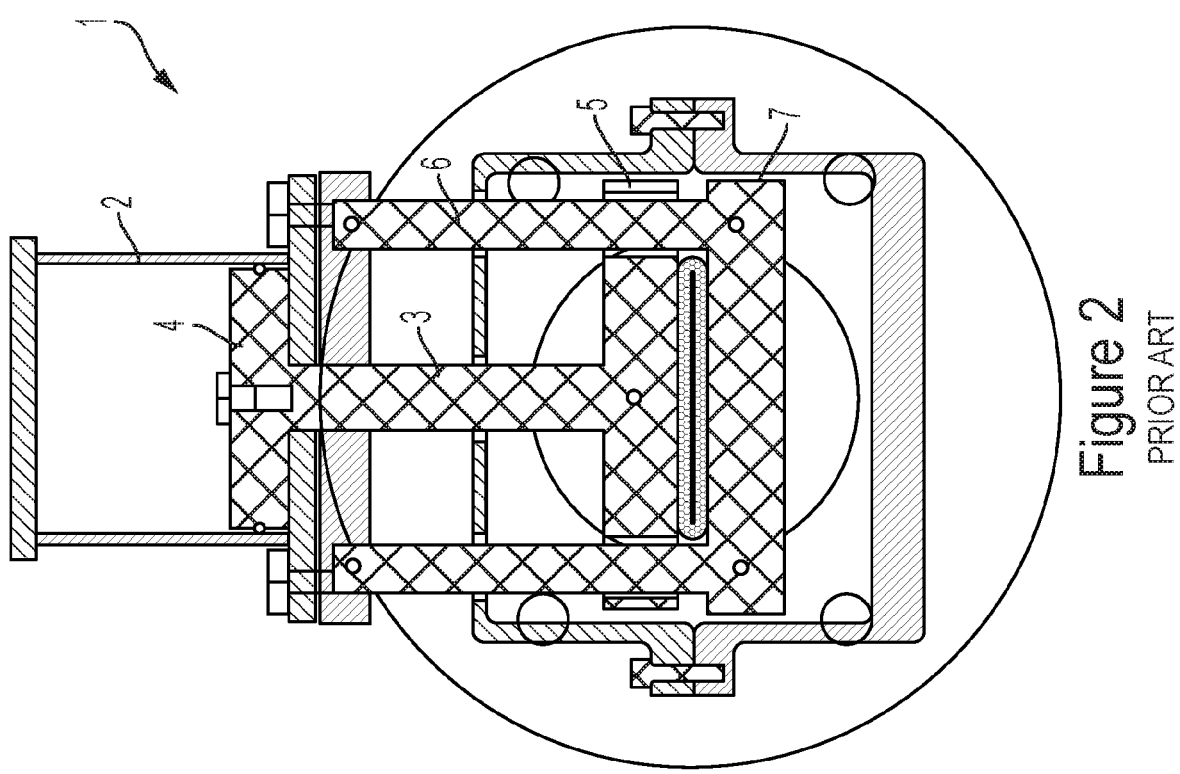
FIG. 2 shows the prior art pinch valve in a closed configuration.
Figure 3:
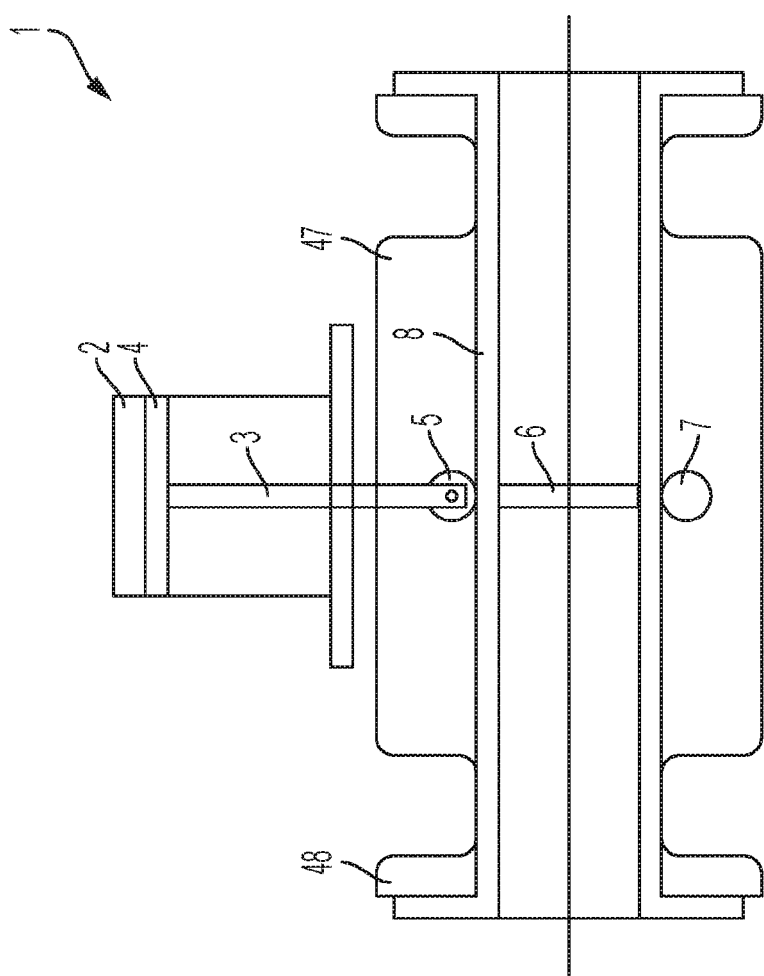
FIG. 3 shows a side cross-sectional elevation view of the prior art pinch valve in an open configuration.
Figure 4:
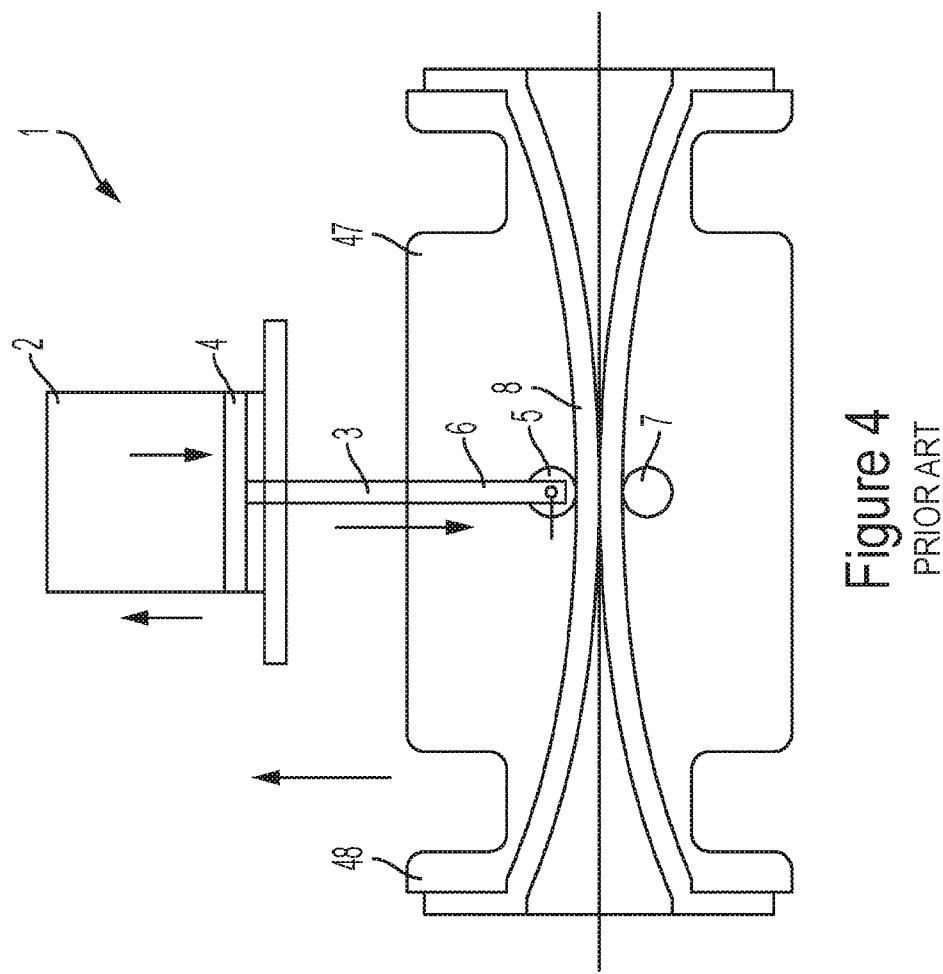
FIG. 4 shows a cross-sectional elevation view of the prior art pinch valve in a closed configuration.

For the purposes of promoting an understanding of the principles in accordance with the disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure.

Before the structures, systems and associated methods relating to the pinch valve are disclosed and described, it is to be understood that this disclosure is not limited to the particular configurations, process steps, and materials disclosed herein as such may vary somewhat. It is also to be understood that the terminology employed herein is used for the purpose of describing particular embodiments only and is not intended to be limiting since the scope of the disclosure will be limited only by the claims and equivalents thereof.

In describing and claiming the subject matter of the disclosure, the following terminology will be used in accordance with the definitions set out below.

It must be noted that, as used in this specification and the appended claims, the singular forms "a," "an," and "the" include plural referents unless the context clearly dictates otherwise.

As used herein, the terms "comprising," "including," "containing," "characterised by," and grammatical equivalents thereof are inclusive or open-ended terms that do not exclude additional, unrecited elements or method steps.

It should be noted in the following description that like or the same reference numerals in different embodiments denote the same or similar features.

Figure 5:
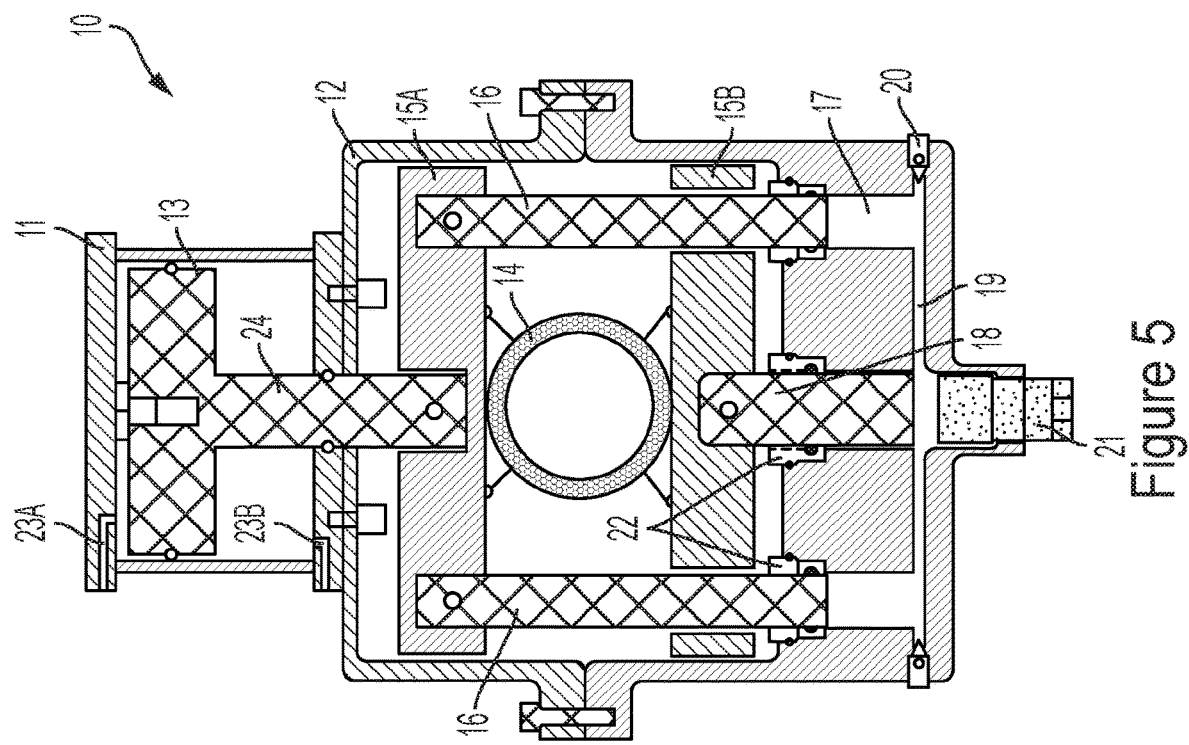
FIG. 5 shows a front elevation view of a pinch valve in an open configuration in accordance with an embodiment.

Turning to FIG. 5, there is shown a pinch valve 10 in accordance with present embodiments.

As will be apparent from the ensuing description, the pinch valve 10 avoids the problems of the prior art pinch valve 1 in not having a floating cylinder. Specifically, as can be seen in FIG. 5, the cylinder body 11 is bolted to the valve housing 12.

Furthermore, the present pinch valve 10 is furthermore further efficient when compared to the prior art pinch valve 1 wherein, and as will be apparent from the ensuing description, the piston 13 need only travel half the distance of the diameter of the sleeve 14.

Now, as is shown in FIG. 5, the pinch valve 10 comprises opposing pinch members 15 for pinching oppositely against a fluid conduit sleeve 14.

Now, the pinch valve 10 is characterised in comprising a hydraulic displacement mechanism acting on the opposing pinch members 15.

Specifically, as is shown in FIG. 5, the hydraulic displacement mechanism comprises at least one hydraulic displacement push rod 16 coupled to the first pinch member 15A at one end. The opposite end of the at least one hydraulic displacement push rod 16 penetrates a hydraulic reservoir 17 at an opposite end to displace hydraulic fluid therein.

The hydraulic displacement mechanism further comprises at least one pinch member push rod 18 also penetrating the hydraulic reservoir 17 at one end and coupled to the second pinch member 15B at an opposite end.

Figure 6:
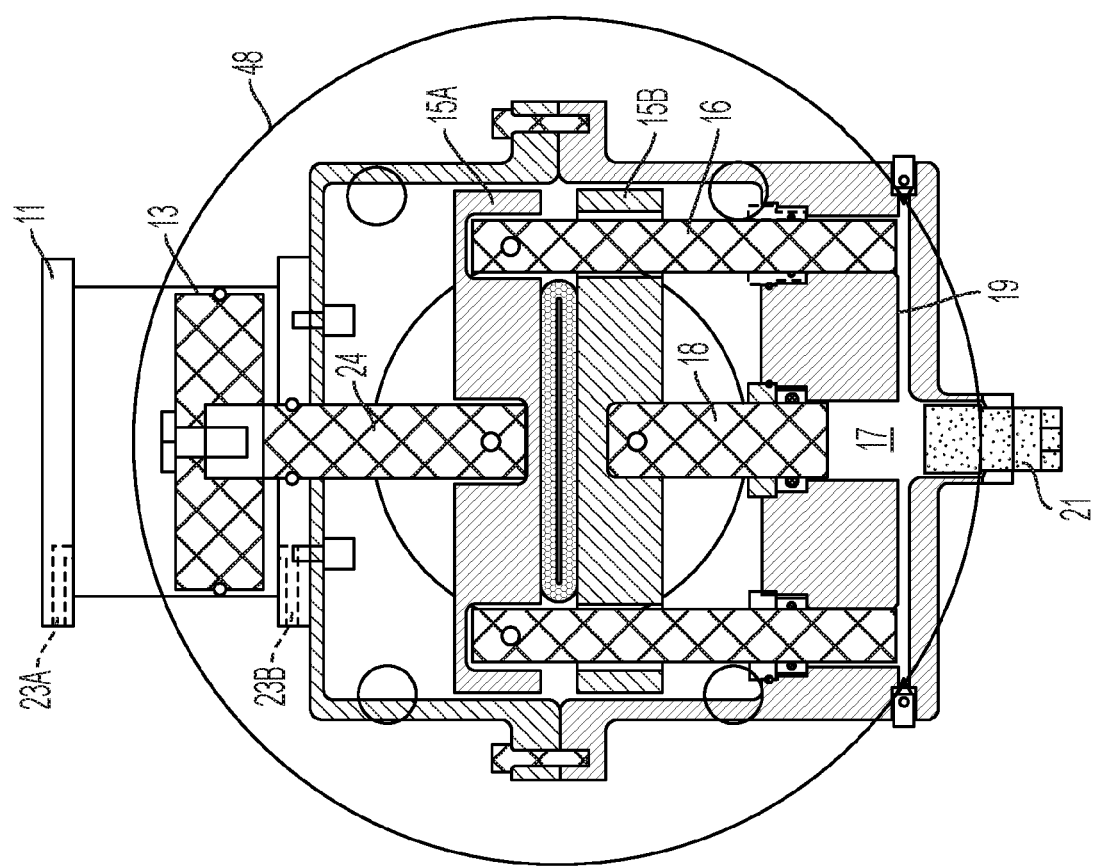
FIG. 6 shows the pinch valve of FIG. 5 in a closed configuration.

As such, and as is further illustrated in FIG. 6, as the first pinch member 15A moves towards the sleeve 14 to pinch against one side of the sleeve, the at least one hydraulic displacement push rod 16 moves into the hydraulic reservoir 17 to displace hydraulic fluid therein so as to cause the pinch member push rod 18 to be pushed from the hydraulic reservoir 17 under pressure to push against the second opposing pinch member 15B to pinch against and opposite side of the valve 14.

As can be appreciated, such an arrangement furthermore allows for centreline closing of the sleeve 14.

The hydraulic reservoir 17 may be filled with a non-compressible fluid such as hydraulic oil or other suitable hydraulic fluid. In this regard, lateral edges of the hydraulic reservoir 17 may comprise bleed valves 20 to remove air from the reservoir 17.

In the embodiment shown in FIGS. 5 and 6, the hydraulic displacement mechanism comprises a pair of hydraulic displacement push rods 16 and a single pinch member push rod 18.

In this regard, the hydraulic reservoir 17 may comprise a pair of corresponding cylindrical chambers for the receipt of the distal ends of the hydraulic displacement push rods 16 therein and a corresponding cylindrical chamber for the receipt of the distal end of the pinch member push rod 18 therein.

As such, as the hydraulic displacement push rods 16 enter the respective cylindrical chambers of the hydraulic reservoir 17, hydraulic fluid is displaced via channels 19 so as to pressurise the cylindrical chamber of the pinch member push rod 18 so as to eject the pinch member push rod 18 therefrom.

The at least one pinch member push rod 18 may have a cross-sectional area being twice that of each of the hydraulic displacement push rods 16 such that the cross-sectional area of the pinch member push rod 18 and the sum of the cross-sectional areas of the hydraulic displacement push rod 16 are equal. In this way, the second pinch member 15B travels equidistantly opposite with respect to the first pinch member 15A allowing for centreline closing.

However, in embodiments, including those provided below, a differing number of push rods 16, 18 may be utilised within the purposive scope of the embodiment provided herein.

The cylindrical chambers may comprise sealant glands 22.

Furthermore, the hydraulic reservoir 17 may comprise a threaded zero adjustment screw 21 to adjust the positioning of the pinch members 15 in the open configuration.

In the embodiment shown in FIGS. 5 and 6, the pinch valve 10 is actuated pneumatically and therefore comprises a pneumatic cylinder 11 acting on a piston 13 therein. The pneumatic cylinder 11 comprises a closing air inlet port 23A and an opening air inlet port 23B.

As such, introduction of air, such as at 80 psi, into the closing air inlet port 23A causes the piston 13 to move downwards to close the pinch valve 10 and, conversely, introduction of compressed air via the opening air inlet port 23B causes the piston 13 to move upwardly to open the valve 10.

The piston 13 comprises a piston rod 24 which acts on the first pinch member 15A.

As can be appreciated, and as alluded to above, the piston 13 need only travel half the distance of the diameter of the sleeve 14 and therefore has greater energy efficiency as compared to prior art pinch valves 1.

It should however be appreciated that other actuated mechanisms may be utilised within the purposive scope of present embodiments as opposed to pneumatic actuators including electromagnetic, hydraulic and manual actuators.

Rolling Diaphragm Hydraulic Displacement Mechanism

Figure 7:
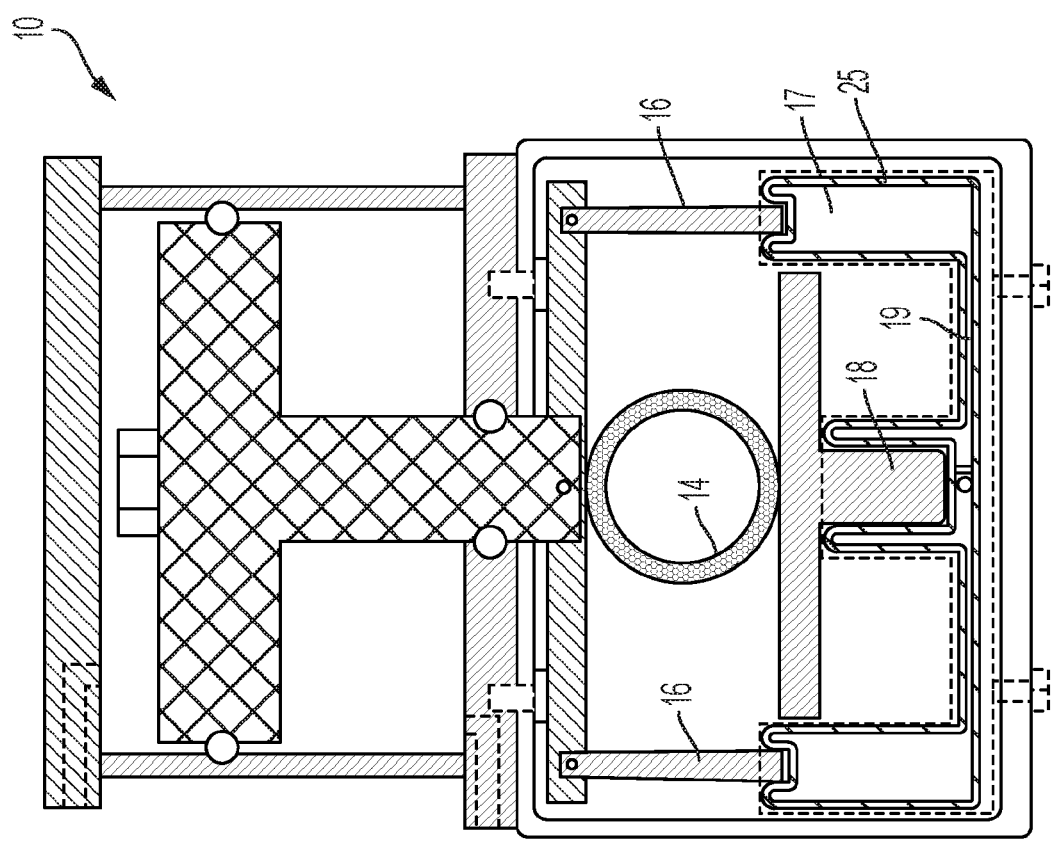
FIG. 7 shows a pinch valve comprising a rolling bellow hydraulic displacement mechanism in accordance with an embodiment.
Figure 8:
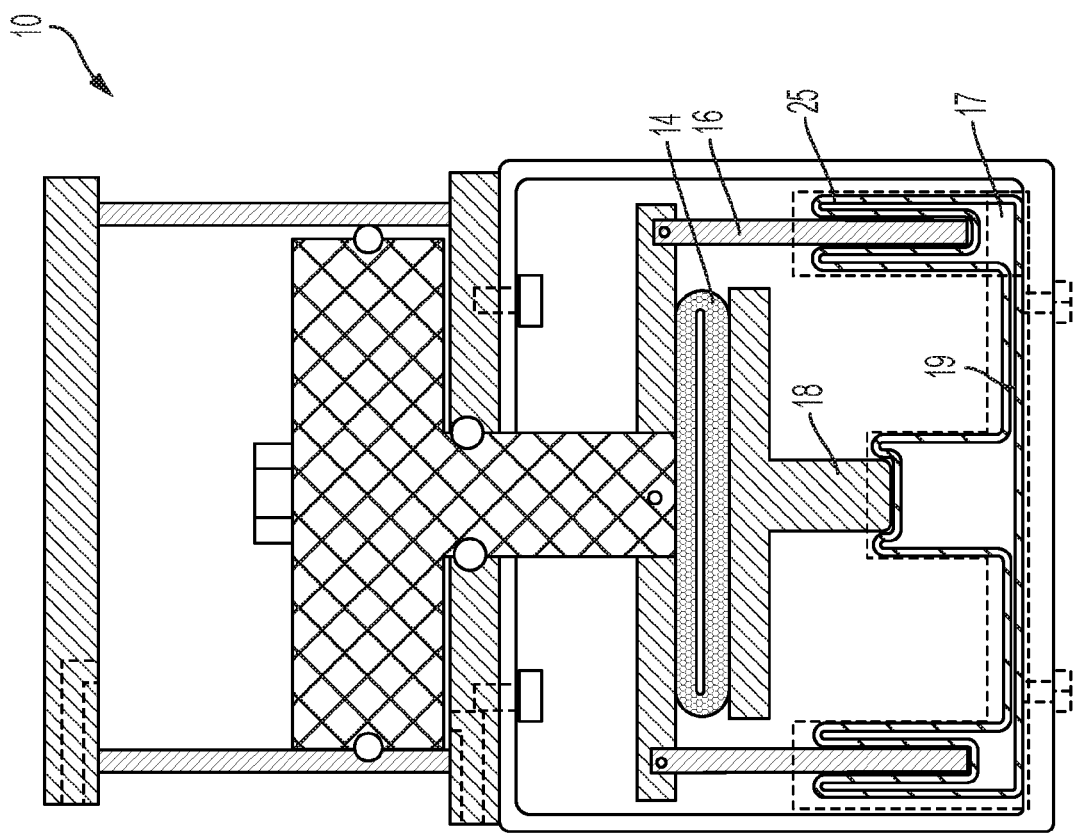
FIG. 8 shows the pinch valve of FIG. 7 in a closed configuration.

FIGS. 7 and 8 show a further embodiment of the pinch valve 10 comprising a "rolling diaphragm" hydraulic displacement mechanism.

In the embodiment shown, the principle of operation is similar except in that, as opposed to the push rods 16 and 18 acting directly on the hydraulic fluid within the hydraulic reservoir 17, the hydraulic reservoir 17 is encased rather within a peripheral flexible diaphragm 25.

As such, and as is shown in FIG. 8, as the hydraulic displacement push rods 16 bear downwardly, the portion of the diaphragm 25 adjacent rolls inwardly effectively displacing hydraulic fluid via the conduit 19 so as to oppositely cause the portion of the diaphragm 25 adjacent the pinch member push rod 18 to roll outwardly so as to displace the pinch member push rod 18 upwardly to pinch the sleeve 14.

In such an embodiment, there is no need for hydraulic fluid sealant glands 22 as the push rods 16, 18 do not directly contact the hydraulic fluid within the reservoir 17.

Flexible Bellows Hydraulic Displacement Mechanism

Figure 9:
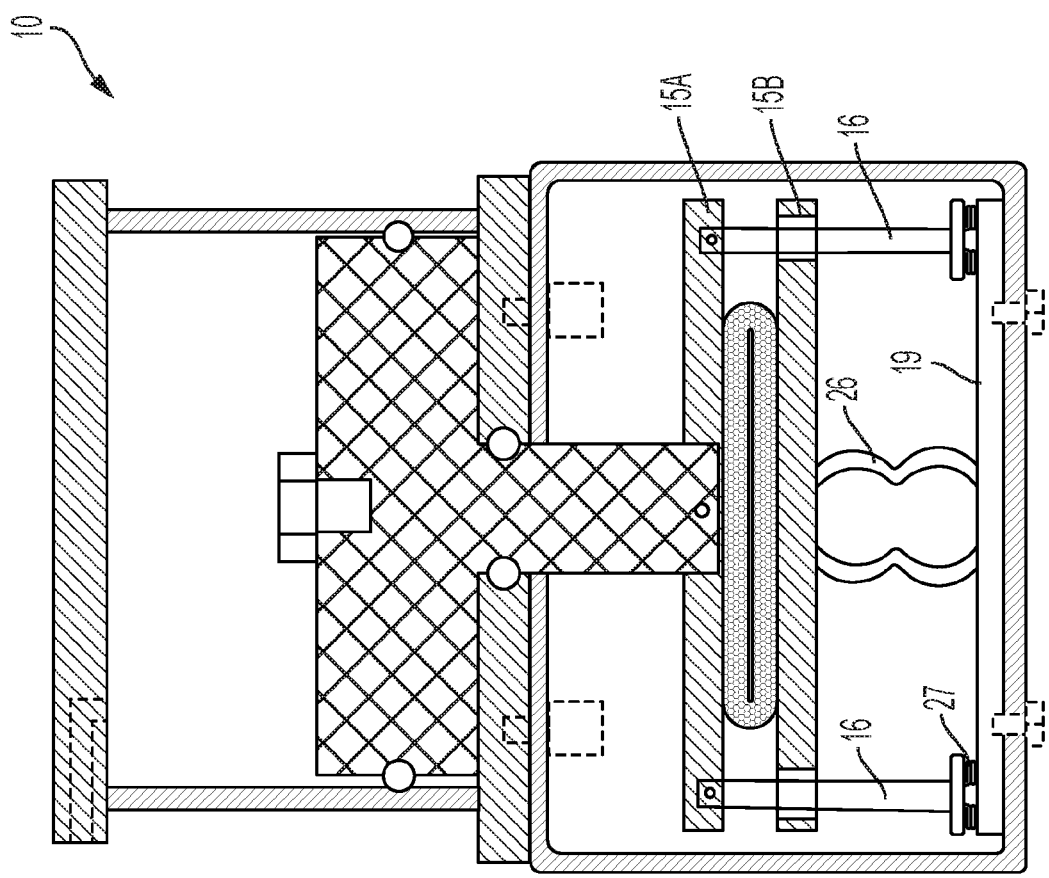
FIGS. 9 and 9a show a pinch valve comprising hydraulic displacement bellows in accordance with an embodiment.
Figure 9A:
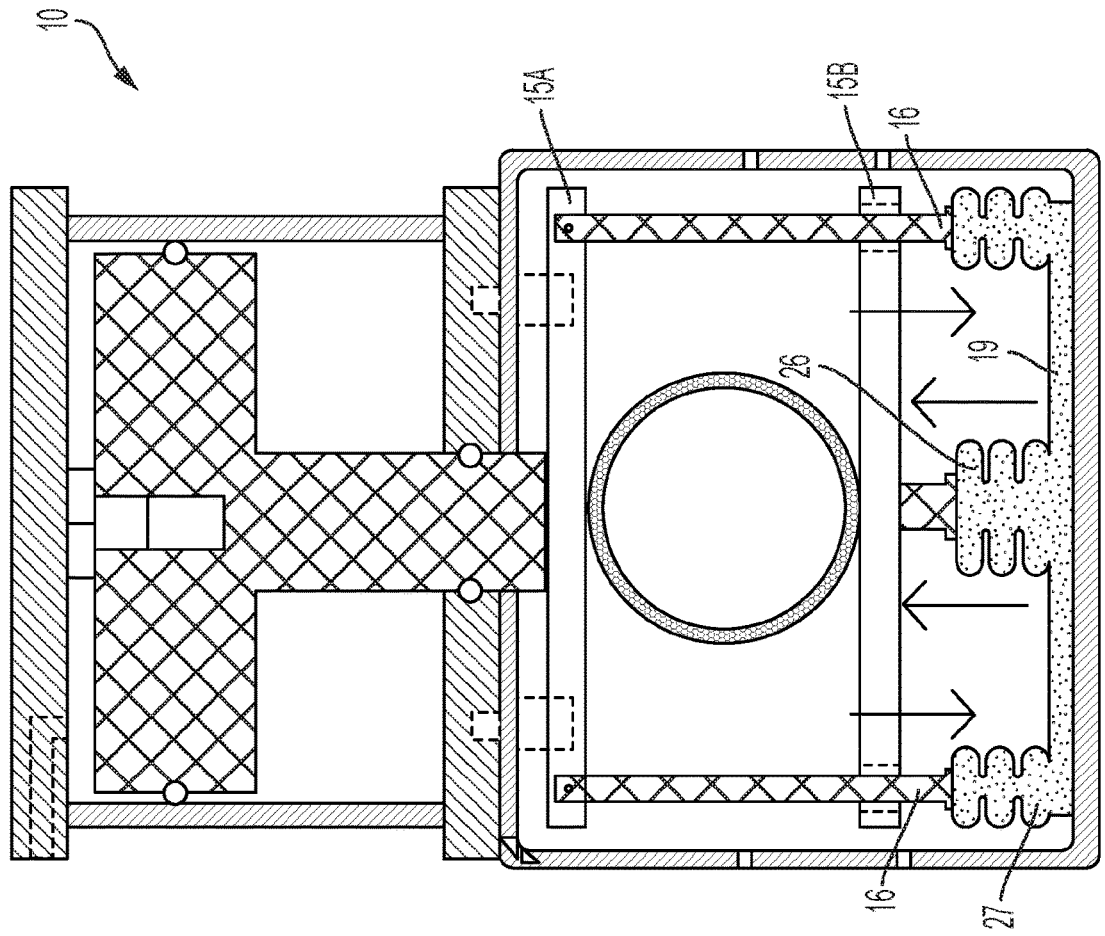

FIGS. 9 and 9a shows a further embodiment of the pinch valve 10 wherein the hydraulic displacement mechanism utilises flexible bellows. Specifically, FIG. 9 shows the pinch valve 10 in the open configuration whereas FIG. 9a shows the pinch valve in the closed configuration.

Specifically, as can be seen, the embodiment comprises a central pinch member push bellow 26 fluidly coupled with the hydraulic channel 19 at a lower end thereof.

Laterally, the hydraulic mechanism similarly comprises a pair of hydraulic displacement push bellows 27 similarly fluidly coupled with the hydraulic channel 19.

As such, as the hydraulic displacement push rods 16 bear downwardly, the hydraulic displacement push bellows 27 are squashed so as to displace hydraulic fluid therefrom into the hydraulic channel 19 thereby causing the pinch member push bellow 26 to inflate so as to act upwardly on the second pinch member 15B.

Similarly, the capacity of the pinch member push bellow 26 may be about equal to the sum of the capacities of the adjacent hydraulic displacement push bellows 27.

Internal Retrofit of the Hydraulic Displacement Mechanism

Turning now to FIG. 10, there is shown an embodiment wherein the hydraulic displacement mechanism may be retrofit internally to an existing pinch valve 1.

Specifically, modification of the existing pinch valve 1 may comprise the bolting of the pneumatic cylinder 2 to the housing 12 of the valve.

Furthermore, a hydraulic reservoir piece 28 and associated push rods 16, 18 may be inserted into the floor of the housing 12 so as to act on the opposing pinch members 15 in the manner described above.

External Retrofit of the Hydraulic Displacement Mechanism

Furthermore, FIG. 11 shows an embodiment wherein the hydraulic displacement mechanism may be retrofit externally to an existing pinch valve 1.

In this embodiment, the pneumatic cylinder 2 is again bolted to the valve housing 12.

However, in this embodiment, the hydraulic displacement piece 28 is rather bolted externally to the housing 12.

Furthermore, appropriate apertures 49 may be made through the floor of the housing 12 to accommodate the push rods 16, 18 accordingly.

Threaded Shaft Manual Handwheel Actuation Mechanism

As alluded to above, differing actuation mechanisms may be utilised for the actuation of the pinch valve 10.

Figure 12:
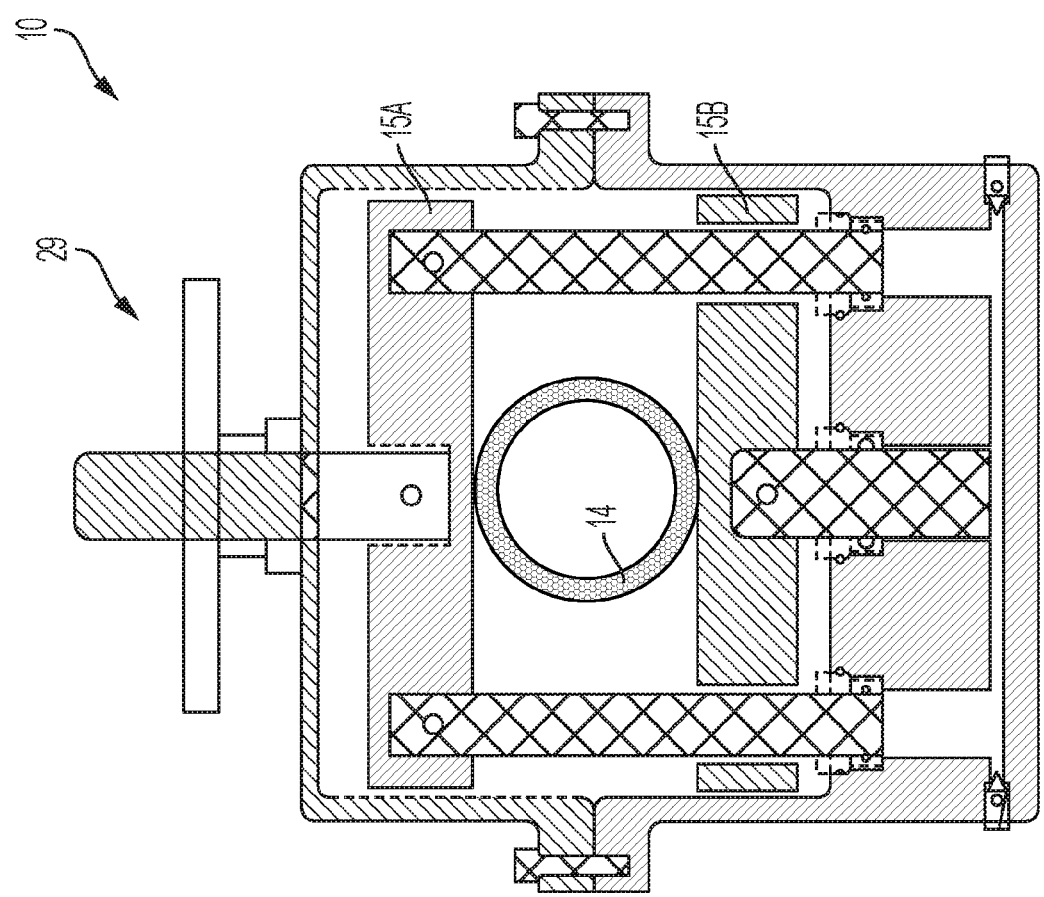
FIG. 12 shows a pinch valve comprising a manual actuator in accordance with an embodiment.

In this regard, reference is now made to FIG. 12 showing an embodiment wherein the pinch valve 10 comprises a threaded shaft manual handwheel 29 which may be rotated manually so as to act on the first pinch member 15A to open and close the sleeve 14.

Dual Acting Manual Override

Figure 13:
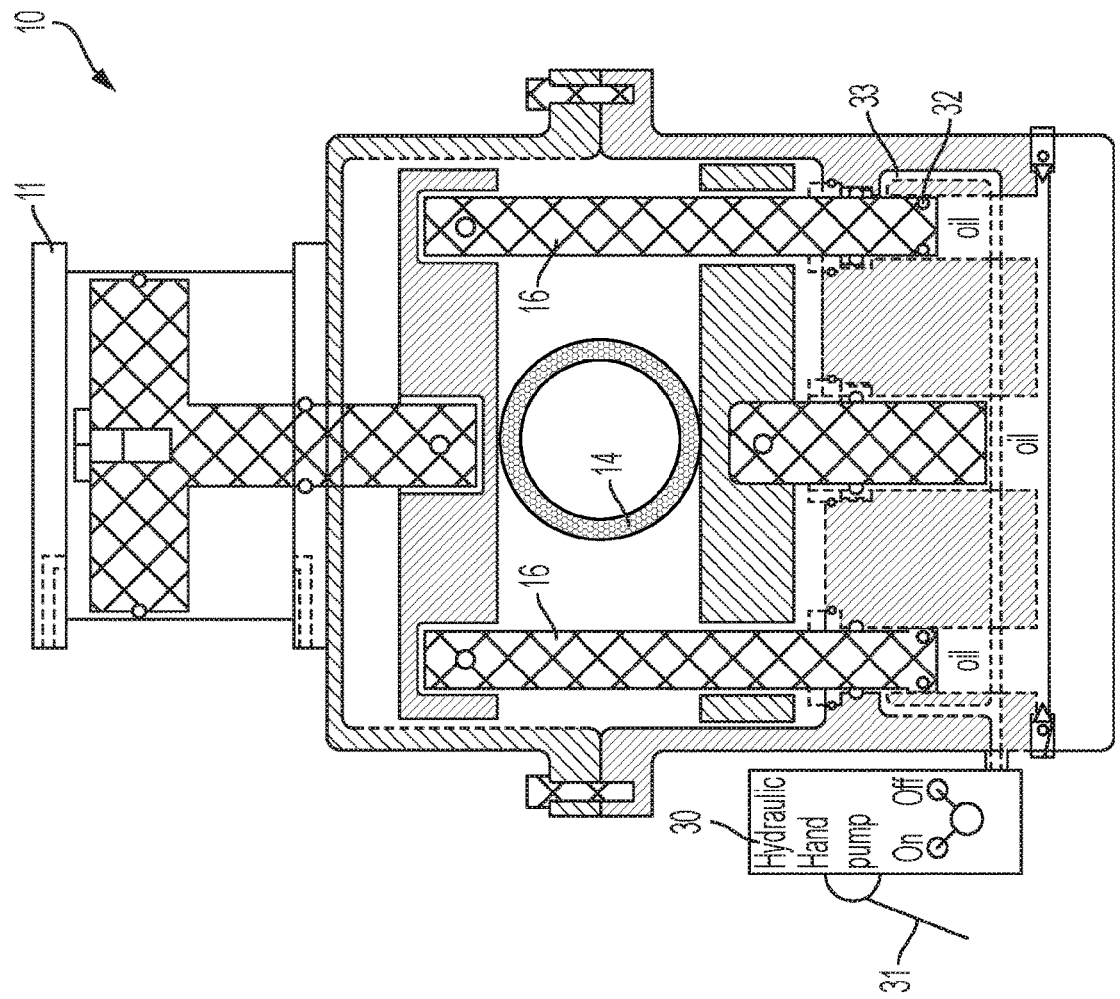
FIG. 13 shows a pinch valve comprising a dual acting manual override in accordance with an embodiment.

Turning to FIG. 13, there is shown an embodiment of the pinch valve 10 comprising a manual override. In this embodiment, the manual override is dual acting in that it acts both on the first and second push members 15.

Specifically, as can be seen, the pinch valve 10 comprises the pneumatic cylinder 11 so as to operate in the normal manner.

However, during loss of power or the like, it may be desirous to close the sleeve 14 and therefore the embodiment shown comprises a manual hydraulic override.

Specifically, the embodiment shows the pinch valve 10 comprising a hydraulic hand pump 30 comprising a hand lever 31 for introducing hydraulic pressure to the hydraulic displacement mechanism for closing the sleeve 14.

Specifically, as can be seen, the distal ends of the hydraulic displacement push valves 16 comprise O-ring seals 32 thereby creating a pressurisation chamber above the O-ring seal 32.

Furthermore, a pressurisation channel 33 is provided between the hydraulic hand pump 30 and the respective pressurisation chambers above each O-ring seal 32.

As such, in use, in order to manually close the sleeve 14, the lever 31 of the hand pump 30 is actuated so as to allow the hand pump 30 to pressurise the pressurisation conduits 33 and therefore also the pressurisation chambers so as to push the hydraulic displacement push rods 16 downwardly so as to cause the pinch valve 10 to close in the manner described herein.

Single Acting Manual Override

Figure 14:
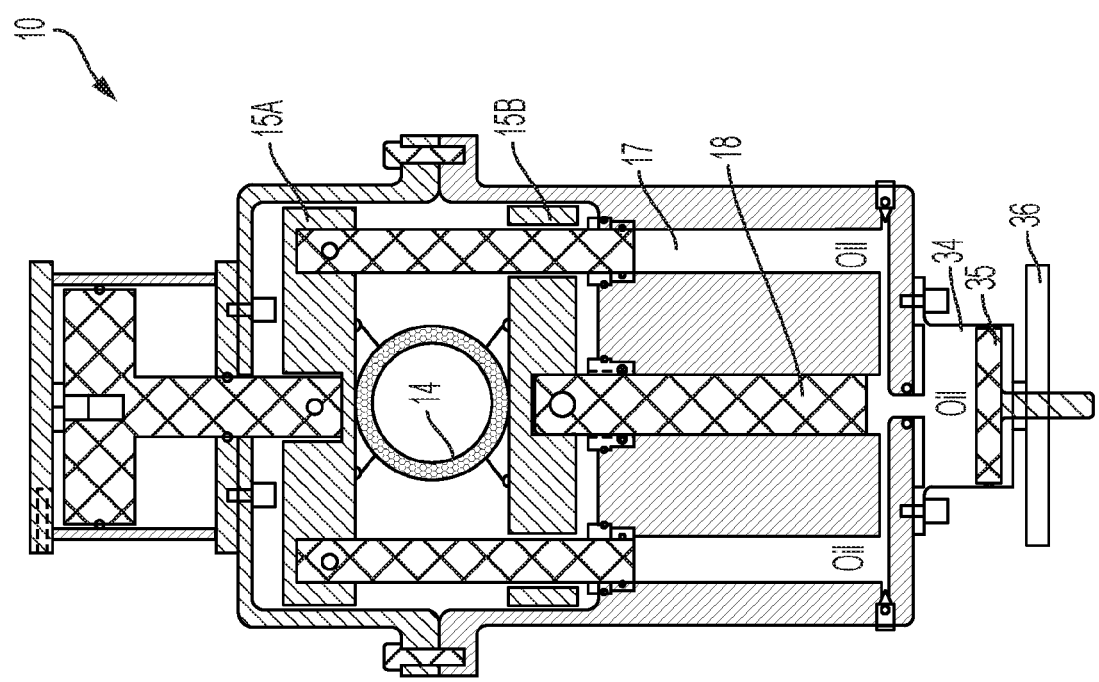
FIG. 14 shows a pinch valve comprising a unitary acting manual override in accordance with an embodiment.

Turning to FIG. 14, there is shown an alternative manual override mechanism allowing for the closing of the sleeve 14 during loss of power. In this embodiment, the manual override is single acting in that it acts only on the second pinch member 15B.

Specifically, there is shown the pinch valve 10 comprising a manual override pressurisation chamber 34 having a piston 35 therein which is controlled utilising a threaded manual handwheel 36.

As such, actuation of the handwheel 36 causes the piston 35 to displace hydraulic fluid from within the pressurisation chamber 34 and into the reservoir 17.

In this embodiment, the manual override acts only on the pinch member push rod 18 so as to act only on the second pinch member 15B wherein the first pinch member 15A stays in place.

In this embodiment, as can be seen, the pinch member push rod 18 is lengthened so as to allow the pinch member push rod 18 to travel the entire diameter of the sleeve 14. Similarly, the interior volume of the pressurisation chamber 34 is sufficient so as to be able to volumetrically displace the push rod 18 such a distance.

Use of Hydraulic Cylinders

Figure 15:
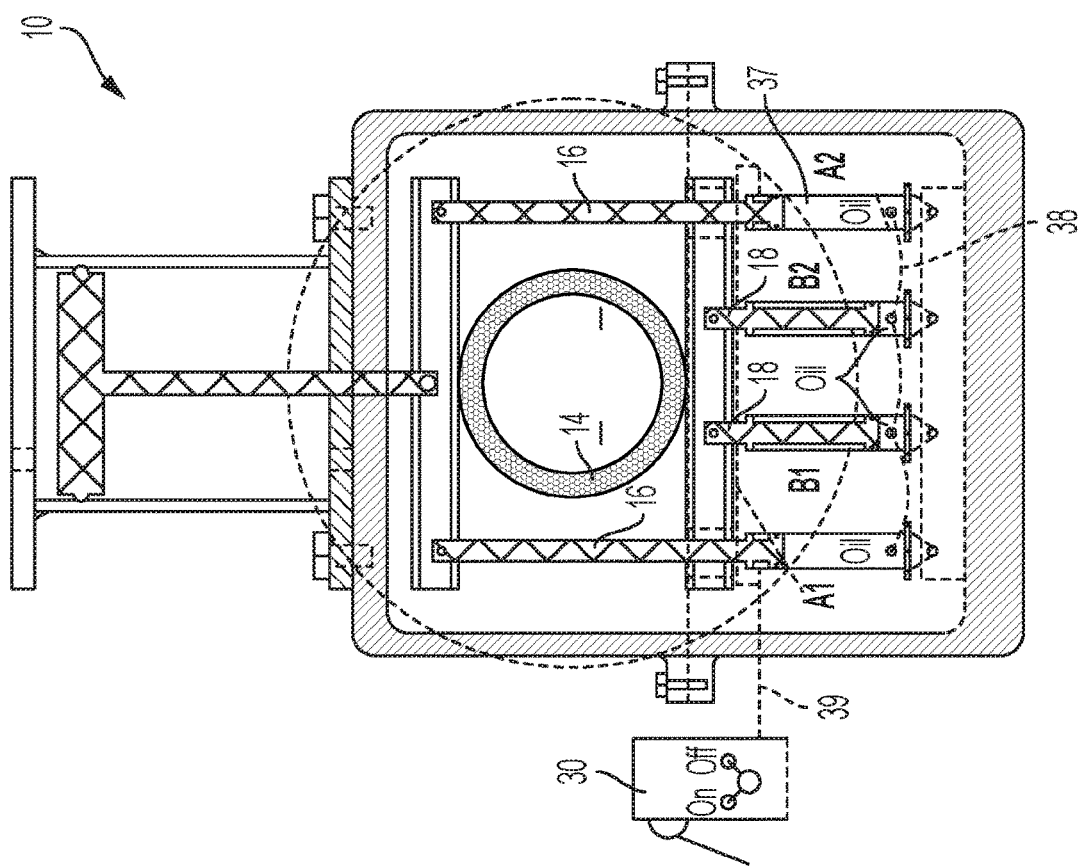
FIG. 15 shows a pinch valve comprising conventional hydraulic cylinders in accordance with an embodiment.

Turning to FIG. 15, there is shown an embodiment of the pinch valve 10 wherein standard hydraulic cylinders 37 are utilised.

Such an embodiment may be especially advantageous for larger pinch valve 10 and wherein ruggedised and industry tested conventional hydraulic cylinders 37 may be utilised.

In the embodiment shown, four hydraulic cylinders 37 are shown comprising two hydraulic cylinders 37 labelled A1 and A2 being operably coupled to the hydraulic displacement push rods 16 and a further pair of hydraulic cylinders 37 labelled B1 and B2 each acting on an associated pinch member push rod 18.

Furthermore, the hydraulic cylinders 37 may be interconnected by way of hydraulic hosing 38 such that hydraulic fluid displaced from hydraulic cylinders A1 and A2 enters hydraulic cylinders B1 and B2 and vice versa.

In the embodiment shown, the embodiment may further comprise a manual override hydraulic hand pump 30 having hydraulic hosing 39 acting on the upper portions of the hydraulic displacement push rod hydraulic cylinders 37 so as to allow for the manual closing of the sleeve in the manner described above.

Laterally Located Hydraulic Displacement Mechanism

Figure 16:
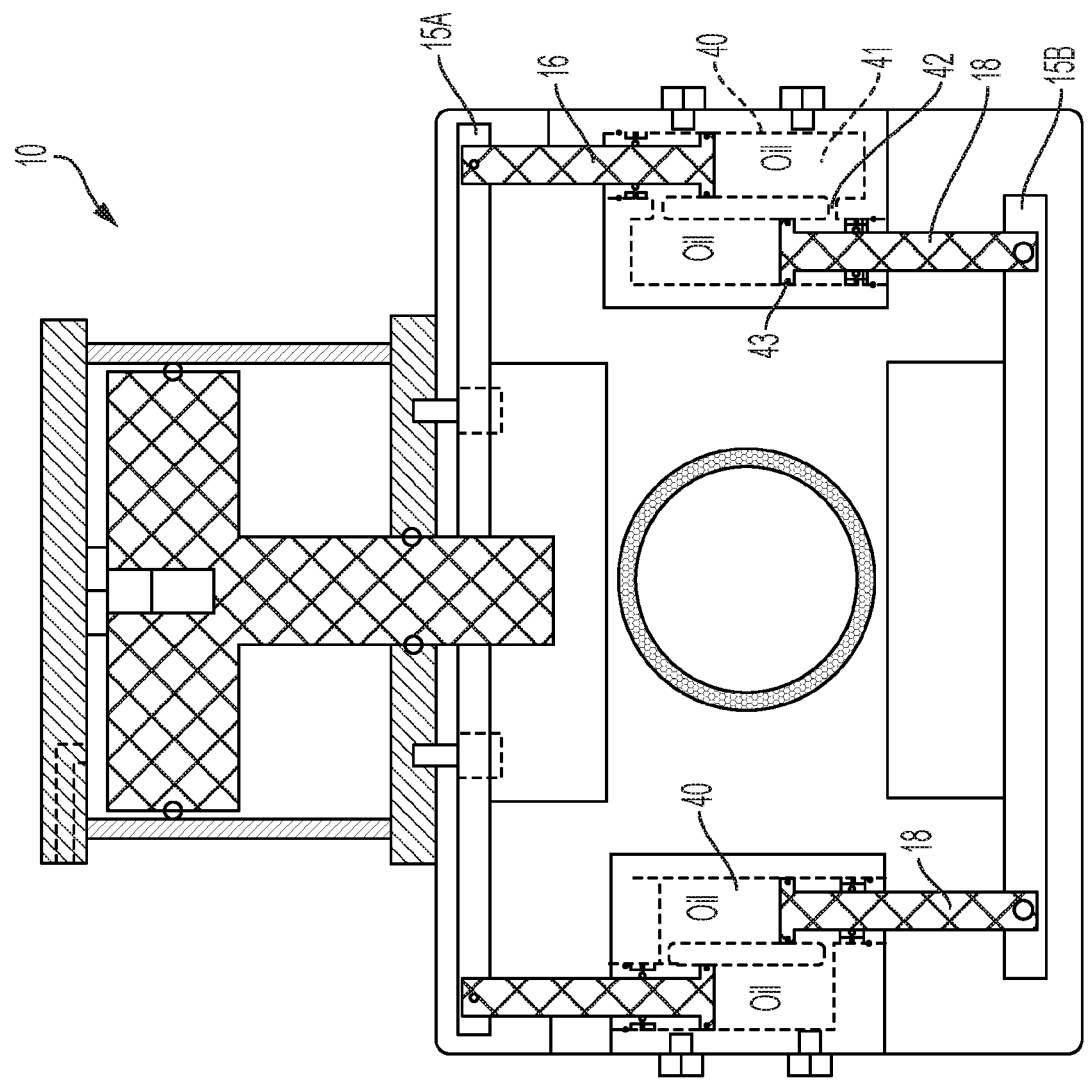
FIG. 16 shows a pinch valve comprising a laterally located hydraulic displacement portions in accordance with an embodiment.

Turning now to FIG. 16, there is shown a further embodiment of the pinch valve 10 wherein the hydraulic displacement mechanism sits laterally as opposed to substantially underneath as per the previous embodiments.

As can be seen, in this embodiment, the hydraulic displacement mechanism comprises a pair of laterally located opposite displacement mechanisms 40.

Specifically, each opposite displacement mechanism 40 comprises a pair of push rods 16, 18 wherein displacement of the hydraulic displacement push rod 16 into a first cylindrical chamber 41 causes hydraulic fluid to be displaced therefrom via channel 42 to underneath a piston 43 of the pinch member push rod 18 causing the pinch member push rod 18 to travel oppositely.

Furthermore, as is shown, as opposed to the pinch valve 10 comprising a single pinch member push rod 18, the embodiment comprises a pair of lateral pinch member push rod 18 engaging lateral edges of the second pinch member 15B.

In this embodiment, the cross-sectional surface area of the pinch member push rods 18 equal that of the cross-sectional surface area of the hydraulic displacement push rods 16.

Hydraulic Hosing

Figure 17:
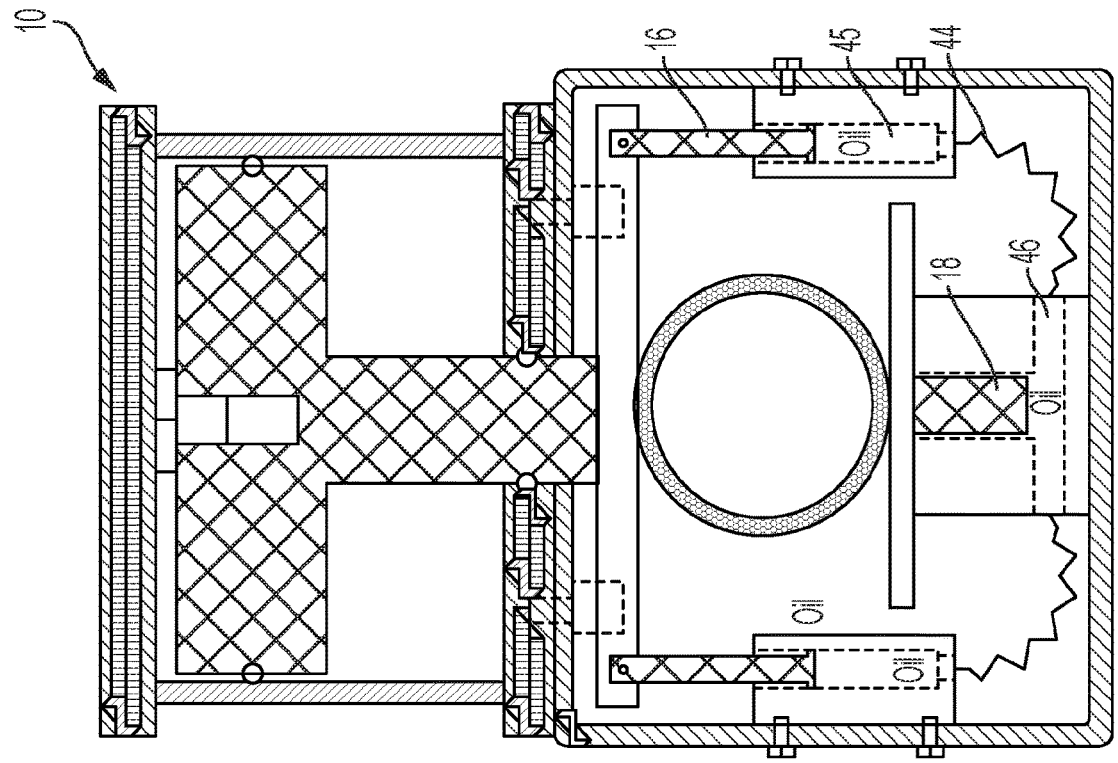
FIG. 17 shows a pinch valve comprising hydraulic hose interconnecting pressurisation chambers of the hydraulic displacement mechanism in accordance with an embodiment.

Turning now to FIG. 17, there is shown a yet further embodiment of the pinch valve 10 wherein, as opposed to comprising the aforedescribed hydraulic channel 19, the pinch valve 10 rather comprises hydraulic hosing 44 interconnecting a hydraulic reservoir 45 associated with the hydraulic displacement push rods 16 and a hydraulic reservoir 46 associated with the pinch member push rod 18.

Interpretation Embodiments:

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description of Specific Embodiments are hereby expressly incorporated into this Detailed Description of Specific Embodiments, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Different Instances of Objects

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Specific Details

In the description provided herein, numerous specific details are set forth. However, it is understood that embodiments of the invention may be practiced without these specific details. In other instances, well-known methods, structures and techniques have not been shown in detail in order not to obscure an understanding of this description.

Terminology

In describing the preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar technical purpose. Terms such as "forward", "rearward", "radially", "peripherally", "upwardly", "downwardly", and the like are used as words of convenience to provide reference points and are not to be construed as limiting terms.

Comprising and Including

In the claims which follow and in the preceding description of the invention, except where the context requires otherwise due to express language or necessary implication, the word "comprise" or variations such as "comprises" or "comprising" are used in an inclusive sense, i.e. to specify the presence of the stated features but not to preclude the presence or addition of further features in various embodiments of the invention.

Any one of the terms: including or which includes or that includes as used herein is also an open term that also means including at least the elements/features that follow the term, but not excluding others. Thus, including is synonymous with and means comprising.

Scope of Invention

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

Although the invention has been described with reference to specific examples, it will be appreciated by those skilled in the art that the invention may be embodied in many other forms.

INDUSTRIAL APPLICABILITY

It is apparent from the above, that the arrangements described are applicable to the valve industry.

The invention claimed is:

1. A pinch valve assembly comprising:
opposing pinch members for pinching oppositely against a fluid conduit sleeve;
a hydraulic displacement mechanism acting on the opposing pinch members, the hydraulic displacement mechanism comprising:
at least one hydraulic displacement push rod coupled to a first pinch member at one end and penetrating a hydraulic reservoir at an opposite end to displace hydraulic fluid therein;
at least one pinch member push rod penetrating the hydraulic reservoir at one end and coupled to a second pinch member at an opposite end such that, in use:
as the first pinch member moves towards the sleeve to pinch against one side of the sleeve, the at least one hydraulic displacement push rod moves into the hydraulic reservoir to displace hydraulic fluid therein to cause the pinch member push rod to be pushed from the hydraulic reservoir under pressure to push against the second pinch member to pinch against an opposite side of the sleeve.

2. The pinch valve assembly as claimed in claim 1, wherein the at least one hydraulic displacement push rod is a pair of hydraulic displacement push rods connected at opposite ends of the first opposing pinch member.

3. The pinch valve assembly as claimed in claim 2, wherein the at least one pinch member push rod is a single pinch member push rod connected substantially midway the second pinch member.

4. The pinch valve assembly as claimed in claim 3, wherein the cross-sectional area of the pair of hydraulic displacement push rods equals that of the single pinch member push rod.

5. The pinch valve assembly as claimed in claim 1, further comprising a pair of cylindrical chamber portions for the receipt of a pair of hydraulic displacement push rods therein and a single cylindrical chamber portion for the receipt of the single pinch member push rod therein and further comprising hydraulic fluid channels fluidly connecting the cylindrical chamber portions.

6. The pinch valve assembly as claimed in claim 1, further comprising an actuator mechanism comprising a piston rod operably coupled to the first pinch member.

7. The pinch valve assembly as claimed in claim 6, wherein the actuator mechanism is a pneumatic actuator mechanism.

8. The pinch valve assembly as claimed in claim 7, wherein the pneumatic actuator mechanism comprises an opening air port and a closing air port.

9. The pinch valve assembly as claimed in claim 1, further comprising a zero adjustment mechanism operably coupled to the hydraulic reservoir for adjusting the position of the pinch members in an open configuration.

10. The pinch valve assembly as claimed in claim 9, wherein the zero adjustment mechanism comprises a threaded zero adjustment screw operably coupled to the reservoir for incrementally pressurising the reservoir.

11. The pinch valve assembly as claimed in claim 1, wherein the hydraulic displacement mechanism comprises a peripheral flexible diaphragm containing the hydraulic fluid therein and wherein the at least one hydraulic displacement push rod bears against the diaphragm so as to cause an adjacent region of the diaphragm to roll inwardly so as to displace hydraulic fluid so as to conversely cause a region of the diaphragm adjacent the at least one pinch member push rod to roll outwardly to displace the pinch member push rod.

12. The pinch valve assembly as claimed in claim 1, wherein the hydraulic displacement mechanism comprises bellows comprising at least one pinch member push bellow in fluid communication with at least one hydraulic displacement push bellow and wherein the hydraulic displacement push rods act on the at least one hydraulic displacement push bellows so as to inflate the at least one pinch member push bellow.

13. The pinch valve assembly as claimed in claim 12, wherein the maximum interior volume of the at least one pinch member push bellow is larger than that of the at least one at least one hydraulic displacement push bellow.

14. The pinch valve assembly as claimed in claim 1, further comprising a hydraulic override for controlling the closing together of the first and second pinch members.

15. The pinch valve assembly as claimed in claim 14, wherein the hydraulic override comprises the ends of the at least one hydraulic displacement push rod within the reservoir comprising an O-ring so as to define a pressurisation chamber above the O-ring and further comprising a pressurising means to pressurise the pressurisation chamber above the O-ring so as to displace the hydraulic displacement push rods downwardly.

16. The pinch valve assembly as claimed in claim 15, wherein the pressurising means comprises a hydraulic hand pump and pressurisation conduits operably coupling the hydraulic hand pump and the pressurisation chamber.

17. The pinch valve assembly as claimed in claim 1, further comprising a hydraulic override for controlling the displacement of the second pinch member.

18. The pinch valve assembly as claimed in claim 17, wherein the hydraulic override comprises a pressurisation chamber for selectively pressurising the hydraulic reservoir so as to displace the at least one pinch member push rod.

19. The pinch valve assembly as claimed in claim 18, wherein the at least one pinch member push rod has a length substantially greater or equal to the length of the diameter of the sleeve.

20. The pinch valve assembly as claimed in claim 1, wherein the hydraulic displacement mechanism comprises a pair of laterally located hydraulic reservoirs each comprising a hydraulic displacement push rod and a pinch member push rod acting oppositely and wherein the pinch member push rods act on opposite sides of the second pinch member.

\* \* \* \* \*